US009242667B2

(12) United States Patent
Yoshihara et al.

(10) Patent No.: US 9,242,667 B2
(45) Date of Patent: Jan. 26, 2016

(54) STEERING DEVICE

(71) Applicants: JTEKT CORPORATION, Osaka-shi, Osaka (JP); TOYOTA JIDOSHA KABUSHIKI KAISHA, Toyota-shi, Aichi-ken (JP); FUJI KIKO CO., LTD., Kosai-shi, Shizuoka (JP)

(72) Inventors: Yoshihito Yoshihara, Kashihara (JP); Tomonori Sugiura, Yamatokoriyama (JP); Yuji Takahashi, Obu (JP); Atsumune Nagatani, Kashihara (JP); Tatsuro Kubota, Shiki-gun (JP); Shigeru Hoshino, Toyota (JP); Yota Uesaka, Toyohashi (JP)

(73) Assignees: JTEKT CORPORATION, Osaka (JP); TOYOTA JIDOSHA KABUSHIKI KAISHA, Toyota (JP); FUJI KIKO CO., LTD., Kosai (JP)

( * ) Notice: Subject to any disclaimer, the term of this patent is extended or adjusted under 35 U.S.C. 154(b) by 0 days.

(21) Appl. No.: 14/665,385

(22) Filed: Mar. 23, 2015

(65) Prior Publication Data
US 2015/0266499 A1    Sep. 24, 2015

(30) Foreign Application Priority Data

Mar. 24, 2014    (JP) .................................. 2014-060937

(51) Int. Cl.
*B62D 1/19*    (2006.01)
*B62D 1/189*    (2006.01)
*B62D 1/184*    (2006.01)

(52) U.S. Cl.
CPC ............... *B62D 1/195* (2013.01); *B62D 1/184* (2013.01); *B62D 1/189* (2013.01); *B62D 1/19* (2013.01)

(58) Field of Classification Search
CPC combination set(s) only.
See application file for complete search history.

(56) References Cited

U.S. PATENT DOCUMENTS

| 4,244,237 | A | * | 1/1981 | Sprunger | B62D 1/184 403/96 |
|---|---|---|---|---|---|
| 5,287,763 | A | | 2/1994 | Nagashima | |
| 5,580,091 | A | * | 12/1996 | Doty | B60R 22/341 188/371 |
| 5,787,759 | A | * | 8/1998 | Olgren | B62D 1/184 280/777 |
| 7,213,484 | B2 | * | 5/2007 | Sawada | B62D 1/184 280/775 |
| 7,587,959 | B2 | * | 9/2009 | Ridgway | B62D 1/184 280/775 |
| 7,954,852 | B2 | * | 6/2011 | Ueno | B62D 1/16 280/775 |
| 8,042,426 | B2 | * | 10/2011 | Jo | B62D 1/184 280/775 |
| 8,438,944 | B2 | * | 5/2013 | Ridgway | B62D 1/184 280/775 |
| 8,539,855 | B2 | * | 9/2013 | Schnitzer | B62D 1/184 280/775 |

(Continued)

FOREIGN PATENT DOCUMENTS

| EP | 2 576 319 A1 | 4/2013 |
|---|---|---|
| JP | 2011516323 A | 5/2011 |

OTHER PUBLICATIONS

Sep. 7, 2015 Search Report issued in European Patent Application No. 15160370.1.

*Primary Examiner* — Nicole Verley
(74) *Attorney, Agent, or Firm* — Oliff PLC

(57) ABSTRACT

A steering device includes: a steering shaft and a column jacket that are telescopically adjustable in an axial direction; a lock plate provided with a plurality of holes; a support shaft that extends in a cross direction crossing the axial direction and includes a low-strength portion to be broken when a load acts on the steering shaft and the column jacket; and a lock member that advances to the lock plate to be engaged with one of the holes. The lock member is disengaged from the one of holes when the support shaft is broken in a state in which the lock member is engaged with the one of the holes.

3 Claims, 7 Drawing Sheets

(56) References Cited

U.S. PATENT DOCUMENTS

| | | | | |
|---|---|---|---|---|
| 8,622,427 B2* | 1/2014 | Minamigata | ............ | B62D 1/195 280/777 |
| 8,627,742 B2* | 1/2014 | Ridgway | ................ | B62D 1/192 280/777 |
| 8,689,659 B2* | 4/2014 | Schnitzer | ............... | B62D 1/195 280/777 |
| 8,783,717 B2* | 7/2014 | Tinnin | ................... | B62D 1/184 280/777 |
| 8,827,311 B2* | 9/2014 | Schnitzer | ............... | B62D 1/184 188/371 |
| 8,894,097 B2* | 11/2014 | Sulser | ................... | B62D 1/184 280/777 |
| 2003/0006602 A1* | 1/2003 | Waid | ...................... | B62D 1/195 280/777 |
| 2007/0235998 A1* | 10/2007 | Demmon | ................ | B62D 1/187 280/775 |
| 2007/0266814 A1* | 11/2007 | Park | ........................ | B62D 1/184 74/493 |
| 2010/0282016 A1 | 11/2010 | Oehri et al. | | |
| 2010/0300236 A1* | 12/2010 | Goulay | .................. | B62D 1/195 74/493 |
| 2010/0300238 A1* | 12/2010 | Ridgway | ................ | B62D 1/184 74/493 |
| 2012/0266716 A1* | 10/2012 | Sulser | .................... | B62D 1/184 74/493 |
| 2013/0074641 A1 | 3/2013 | Schnitzer et al. | | |
| 2014/0352479 A1* | 12/2014 | Hiesse | .................. | B62D 1/184 74/492 |
| 2015/0076804 A1* | 3/2015 | Hansen | .................. | B62D 1/184 280/775 |

\* cited by examiner

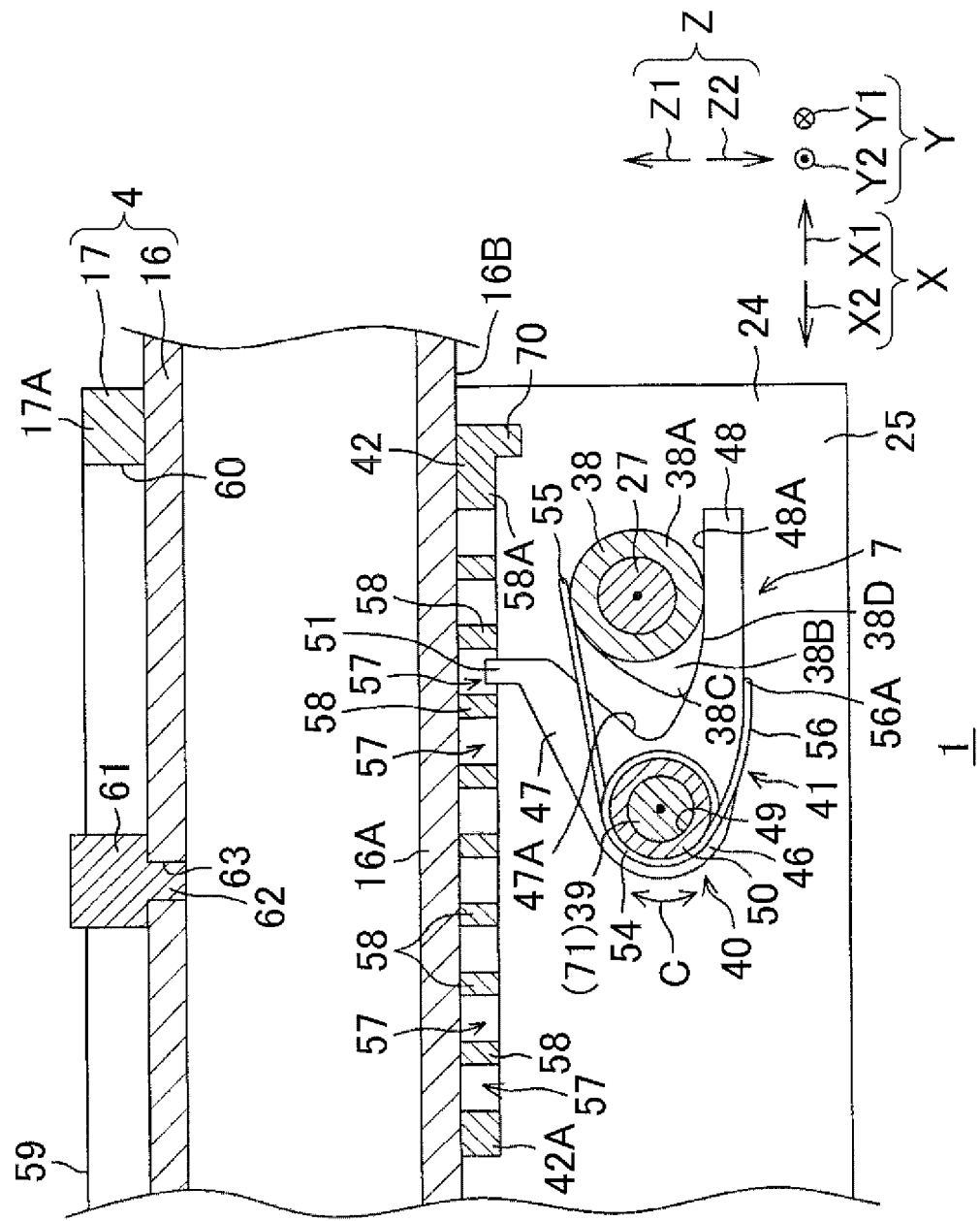

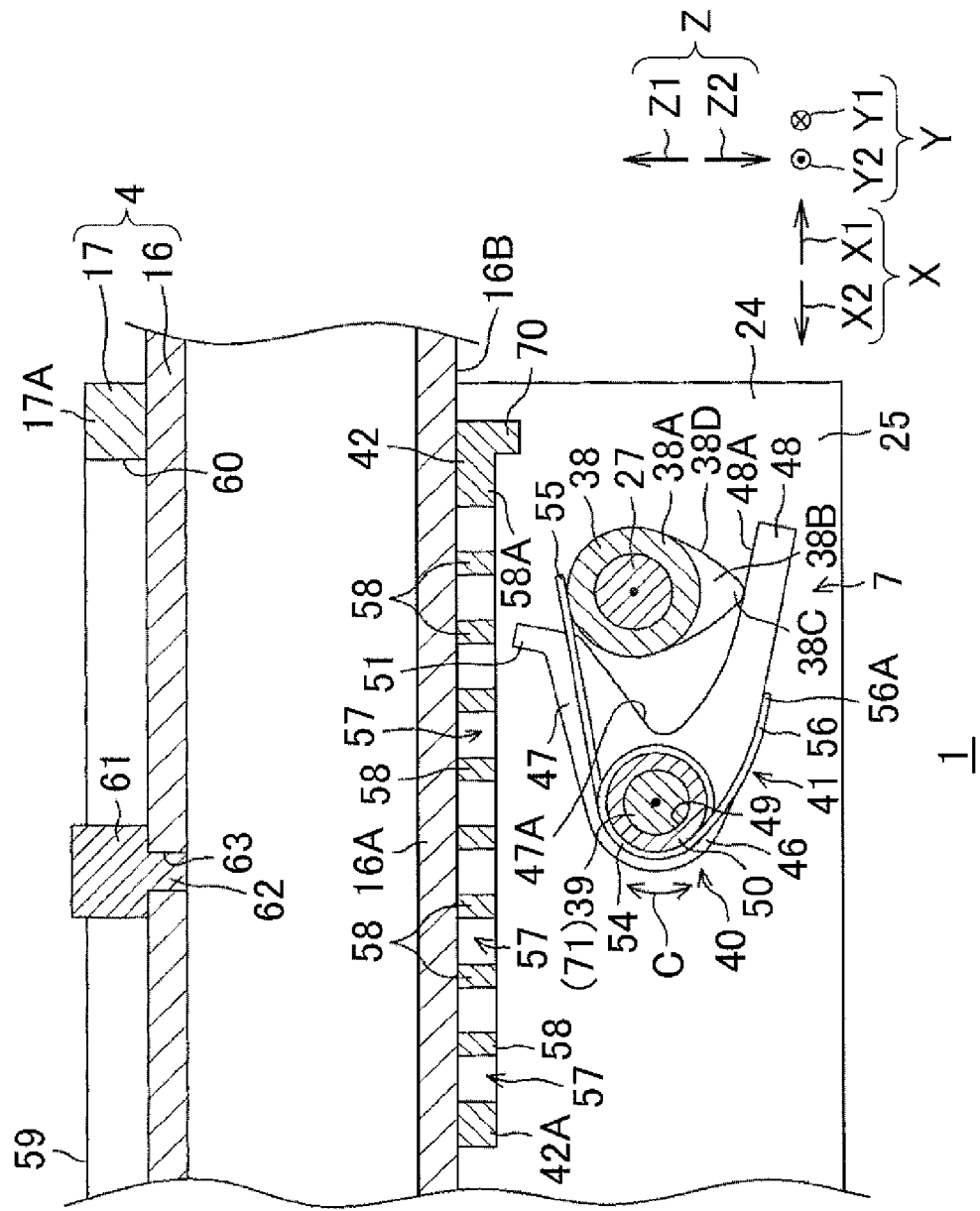

STEERING DEVICE

INCORPORATION BY REFERENCE

The disclosure of Japanese Patent Application No. 2014-060937 filed on Mar. 24, 2014 including the specification, drawings and abstract is incorporated herein by reference in its entirety.

BACKGROUND OF THE INVENTION

1. Field of the Invention

The invention relates to a steering device.

2. Description of Related Art

For example, in a steering column for an automobile descried in Published Japanese Translation of PCT application No. 2011-516323 (JP 2011-516323 A), a steering shaft to which a steering wheel is mounted is rotatably supported by an adjustment unit supported by a support unit. When the adjustment unit is moved in an axial direction of the steering shaft, it is possible to adjust the position of the steering wheel in the axial direction.

The adjustment unit is disposed between a pair of side plates in the support unit. Each side plate is provided with a hole, and a clamping bolt is inserted into the hole. A lock member is attached to the clamping bolt, and an operation lever is coupled to the clamping bolt. To the adjustment unit, an opposite lock member having a large number of notches is coupled via a breakaway plate.

When the operation lever is operated and the clamping bolt is thereby rotated, a protrusion of the lock member is inserted into any of the notches of the opposite lock member, and the position of the steering wheel in the axial direction is locked. In addition, at the time of a vehicle collision, the breakaway plate is deformed, and energy at the time of the vehicle collision is thereby absorbed.

In the steering column described in JP-A-2011-516323, the breakaway plate needs to be additionally provided in order to absorb the energy at the time of the vehicle collision, and hence an increase in the number of components is inevitable. Further, in order to obtain desired characteristics of energy absorption at the time of the vehicle collision, fine adjustment is required such that the breakaway plate is properly deformed.

SUMMARY OF THE INVENTION

The invention provides the steering device capable of obtaining desired characteristics of the energy absorption at the time of the vehicle collision while preventing the increase in the number of components.

An aspect of the invention is a steering device including: a steering shaft including a first end to which a steering member is mounted and a second end, wherein the steering shaft is telescopically adjustable in an axial direction of the steering shaft; a column jacket rotatably supporting the steering shaft and including an upper jacket positioned on a first end side and a lower jacket positioned on a second end side, wherein the column jacket is telescopically adjustable together with the steering shaft with movement of the upper jacket relative to the lower jacket in the axial direction; a lock plate fixed to the upper jacket and provided with a plurality of holes arranged in the axial direction; a support bracket fixed to a vehicle body and supporting the column jacket; an operation member supported by the support bracket, wherein the operation member is operated when the steering shaft and the column jacket are telescopically adjusted; a support shaft that is supported by the lower jacket, extends in a cross direction crossing the axial direction, and includes a low-strength portion to be broken when a load acts on the steering shaft and the column jacket; and a lock member that is rotatably supported by the support shaft, advances to and retreats from the lock plate in accordance with operation of the operation member, and advances to the lock plate to be engaged with one of the holes, wherein the lock member is disengaged from the one of holes when the support shaft is broken in a state in which the lock member is engaged with the one of the holes.

According to the above configuration, in the steering device, when the lock member is engaged with any of the holes in the lock plate fixed to the upper jacket by operating the operation member, it is possible to stop extension and contraction of the steering shaft and the column jacket and lock the position of the steering member in the axial direction.

When a vehicle collision occurs in the state in which the position of the steering member is locked, the support shaft that supports the lock member is broken at the low-strength portion, and the lock member is disengaged from the hole with which the lock member has been engaged in accordance with the breakage. With this, the upper jacket that is allowed to move moves to the second end side. With this movement and the breakage of the support shaft, it is possible to absorb energy at the time of the vehicle collision.

Only by providing the low-strength portion in the support shaft originally serving as a component for supporting the lock member, it is possible to absorb the energy at the time of the vehicle collision without adding a new component. Further, only by adjusting a breakage load of the support shaft by changing the size of the low-strength portion, it is possible to arbitrarily adjust characteristics of energy absorption at the time of the vehicle collision.

As a result, it is possible to obtain desired characteristics of the energy absorption at the time of the vehicle collision while preventing an increase in the number of components.

The support shaft may include a first shaft portion that extends in the cross direction and a second shaft portion that is thicker than the first shaft portion, and the low-strength portion may include a boundary portion between the first shaft portion and the second shaft portion.

According to the above configuration, since the low-strength portion includes the boundary portion between the first shaft portion and the second shaft portion that is thicker than the first shaft portion in the support shaft, only by adjusting the breakage load of the support shaft by adjusting a difference in thickness between the first shaft portion and the second shaft portion, it is possible to obtain desired characteristics of the energy absorption at the time of the vehicle collision.

The steering device may further include a biasing component that biases the support shaft such that a gap between the lock member and the boundary portion in the cross direction is reduced.

According to the above configuration, since the gap between the lock member and the boundary portion in the cross direction in which the support shaft extends is reduced by the biasing component, it is possible to more reliably break the support shaft at the boundary portion with the lock member in the boundary portion at the time of the vehicle collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a schematic sectional view of the steering device 1 taken long the line VI-VI of FIG. 5;

FIG. 7 is a view showing a state in which a tooth 51 of a lock member 40 retreats from a hole 57 in the steering device 1 shown in FIG. 6.

DETAILED DESCRIPTION OF EMBODIMENTS

Hereinbelow, an embodiment of the invention will be described in detail with reference to the accompanying drawings.

Figure 1:
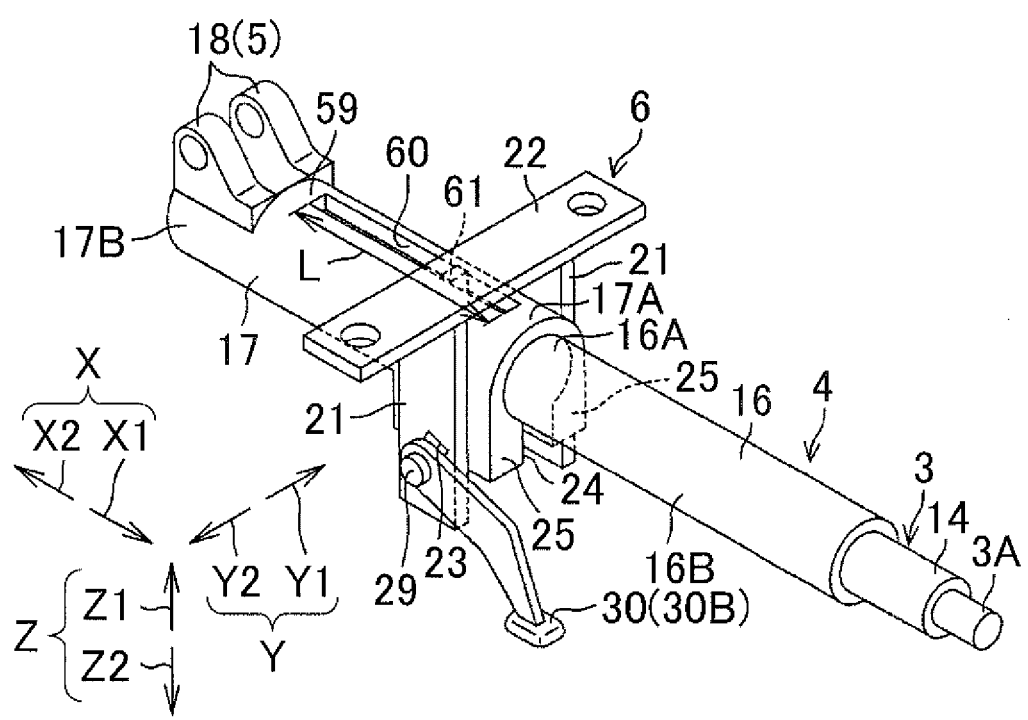
FIG. 1 is a schematic perspective view of a steering device 1 according to an embodiment of the invention.
Figure 2:
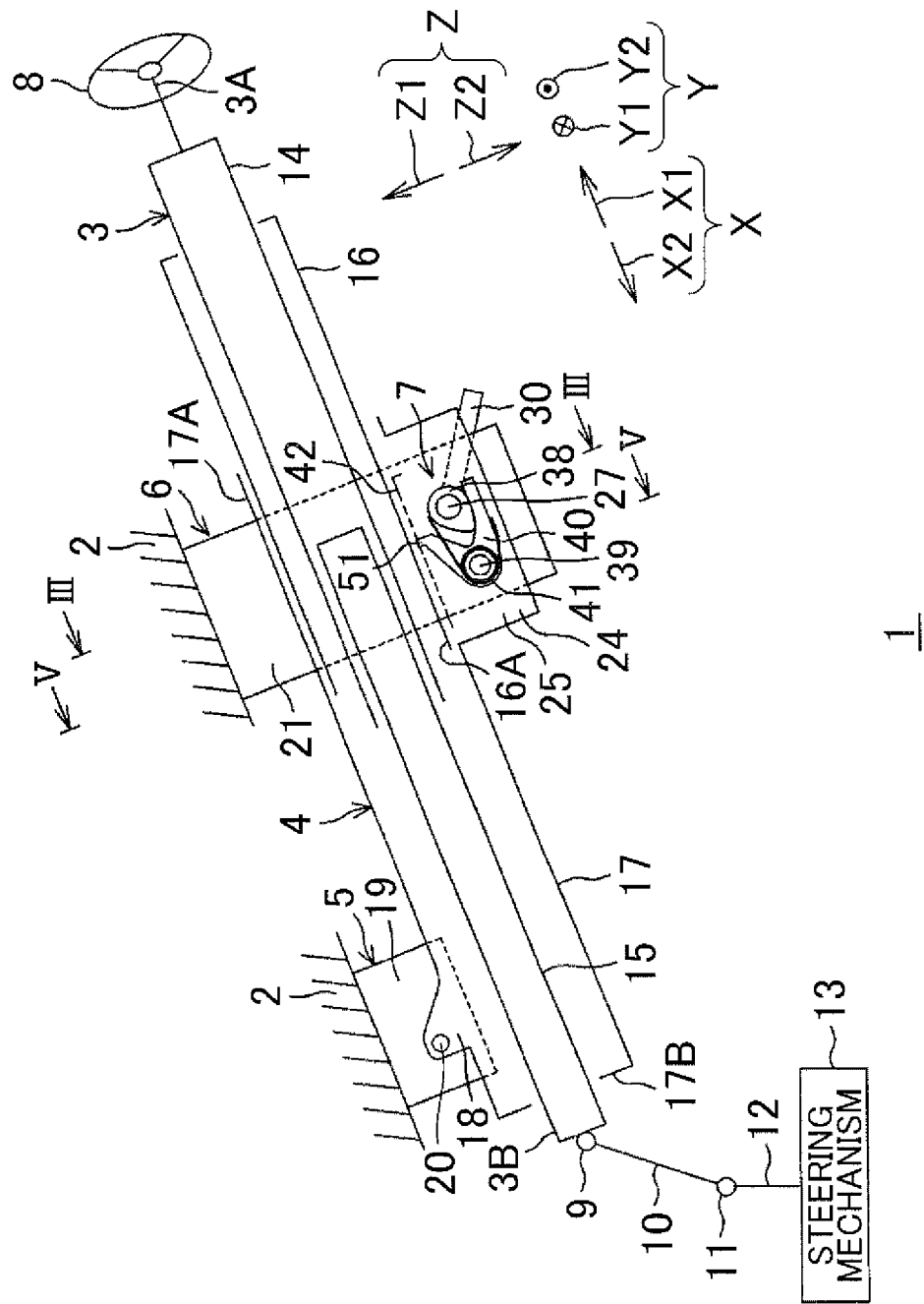
FIG. 2 is a schematic side view showing the schematic configuration of the steering device 1.

FIG. 1 is a schematic perspective view of a steering device 1 according to an embodiment of the invention. FIG. 2 is a schematic side view showing the schematic configuration of the steering device 1.

In FIG. 2, the left side on the paper sheet corresponds to the front side of a vehicle body 2 to which the steering device 1 is mounted, the right side on the paper sheet corresponds to the rear side of the vehicle body 2, the upper side on the paper sheet corresponds to the upper side of the vehicle body 2, and the lower side on the paper sheet corresponds to the lower side of the vehicle body 2.

With reference to FIG. 2, the steering device 1 mainly includes a steering shaft 3, a column jacket 4, a lower bracket 5, an upper bracket 6 as a support bracket, and a lock mechanism 7.

In the steering shaft 3, a steering member 8 is mounted to a first end 3A on the rear side, and a second end 3B on the front side is coupled to a steering mechanism 13 via a universal joint 9, an intermediate shaft 10, a universal joint 11, and a pinion shaft 12. The steering mechanism 13 is constituted by a rack and pinion mechanism and the like. The steering mechanism 13 steers a turning wheel such as a tire that is not shown in response to transmission of rotation of the steering shaft 3.

The steering shaft 3 has a substantially cylindrical or columnar shape that extends in a front-rear direction of the vehicle body 2 as a whole.

In the following description, the direction in which the steering shaft 3 extends is assumed to be an axial direction X. The axial direction X in the embodiment is inclined relative to a horizontal direction such that the second end 3B is lower than the first end 3A. The rear side as the first end side (the side where the steering member 8 is positioned) in the axial direction X is designated by a reference numeral "X1", while the front side as the second end side (the side opposite to the side where the steering member 8 is positioned) in the axial direction X is designated by a reference numeral "X2". The rear side X1 corresponds to the rear side of the vehicle body 2, and the front side X2 corresponds to the front side of the vehicle body 2.

Among directions orthogonal to the axial direction X, a direction perpendicular to the paper sheet in FIG. 2 is referred to as a right-left direction Y, and a direction extending substantially vertically in FIG. 2 is referred to as an up-down direction Z. Note that it is only necessary for the right-left direction Y and the up-down direction Z to cross the axial direction X, and hence the right-left direction Y and the up-down direction Z may not be orthogonal to the axial direction X strictly. In the right-left direction Y, the far side on the paper sheet in FIG. 2 is a right side Y1, and the near side on the paper sheet is a left side Y2. The upper side in the up-down direction Z is designated by a reference numeral "Z1", and the lower side in the up-down direction Z is designated by a reference numeral "Z2".

Note that, in each of the drawings other than FIG. 2, directions corresponding to the directions X to Z in FIG. 2 are designated by the same reference numerals as those in FIG. 2.

The steering shaft 3 includes a cylindrical or columnar upper shaft 14 and a cylindrical or columnar lower shaft 15. The upper shaft 14 is disposed on the rear side X1 of the lower shaft 15. The upper shaft 14 and the lower shaft 15 are concentrically arranged.

An end portion of the upper shaft 14 on the rear side X1 corresponds to the first end 3A of the steering shaft 3, and the steering member 8 is coupled to the end portion of the upper shaft 14 on the rear side X1. In the upper shaft 14, at least an end portion on the front side X2 is formed in a cylindrical shape. Into the end portion of the upper shaft 14 on the front side X2, an end portion of the lower shaft 15 on the rear side X1 is inserted from the front side X2.

The upper shaft 14 and the lower shaft 15 are fitted to each other by spline fitting or serration fitting. Accordingly, the upper shaft 14 and the lower shaft 15 can rotate together integrally, and can move relative to each other along the axial direction X. Therefore, the steering shaft 3 is telescopically adjustable (the steering shaft 3 can extend or contract) in the axial direction X.

The column jacket 4 is a hollow body that extends in the axial direction X as a whole. The steering shaft 3 is accommodated in the column jacket 4. The column jacket 4 has a substantially tubular upper jacket 16 and a substantially tubular lower jacket 17 that extend in the axial direction X.

The upper jacket 16 is positioned on the rear side X1 of the lower jacket 17. In other words, the lower jacket 17 is positioned on the front side X2 of the upper jacket 16. The lower jacket 17 is thicker than the upper jacket 16, and is fitted on the upper jacket 16. Specifically, an end portion 16A of the upper jacket 16 on the front side X2 is inserted into an end portion 17A of the lower jacket 17 on the rear side X1 from the rear side X1. In this state, the upper jacket 16 can move relative to the lower jacket 17 in the axial direction X. With this relative movement, the column jacket 4 is telescopically adjustable in the axial direction X.

In addition, the steering shaft 3 is coupled to the column jacket 4 via a bearing that is not shown, and hence the column jacket 4 rotatably supports the steering shaft 3.

Specifically, the upper shaft 14 and the upper jacket 16 are coupled to each other via a bearing that is not shown. In addition, the lower shaft 15 and the lower jacket 17 are coupled to each other via a bearing that is not shown. Accordingly, the coupled body of the upper shaft 14 and the upper jacket 16 can move relative to the lower shaft 15 and the lower jacket 17 in the axial direction X. With this, the column jacket 4 is telescopically adjustable together with the steering shaft 3.

The positional adjustment of the steering member 8 in the axial direction X by extension or contraction of the steering shaft 3 and the column jacket 4 is called a telescopic adjustment.

The lower bracket 5 supports the portion of the column jacket 4 on the front side X2, and couples the steering device 1 to the vehicle body 2. Specifically, the lower bracket 5 supports the portion of the lower jacket 17 on the front side X2.

The lower bracket 5 includes a movable bracket 18 fixed to the lower jacket 17, a fixed bracket 19 fixed to the vehicle body 2, and a central shaft 20 extending in the right-left direction Y.

A pair of the right and left movable brackets 18 are provided on, e.g., an upper outer peripheral surface of an end portion 17B of the lower jacket 17 on the front side X2 (see FIG. 1). The movable bracket 18 is tiltably supported by the fixed bracket 19 via the central shaft 20. As a result, the entire column jacket 4 can tilt vertically about the central shaft 20 together with the steering shaft 3. An orientation adjustment of the steering member 8 by the tilt is called a tilt adjustment. The lower jacket 17 is coupled to the fixed bracket 19 fixed to the vehicle body 2 via the central shaft 20, and hence the lower jacket 17 can tilt but cannot move in the axial direction X.

The upper bracket 6 supports the portion of the column jacket 4 on the rear side X1 of the movable bracket 18. Specifically, the upper bracket 6 supports the portion of the lower jacket 17 on the rear side X1.

Figure 3:
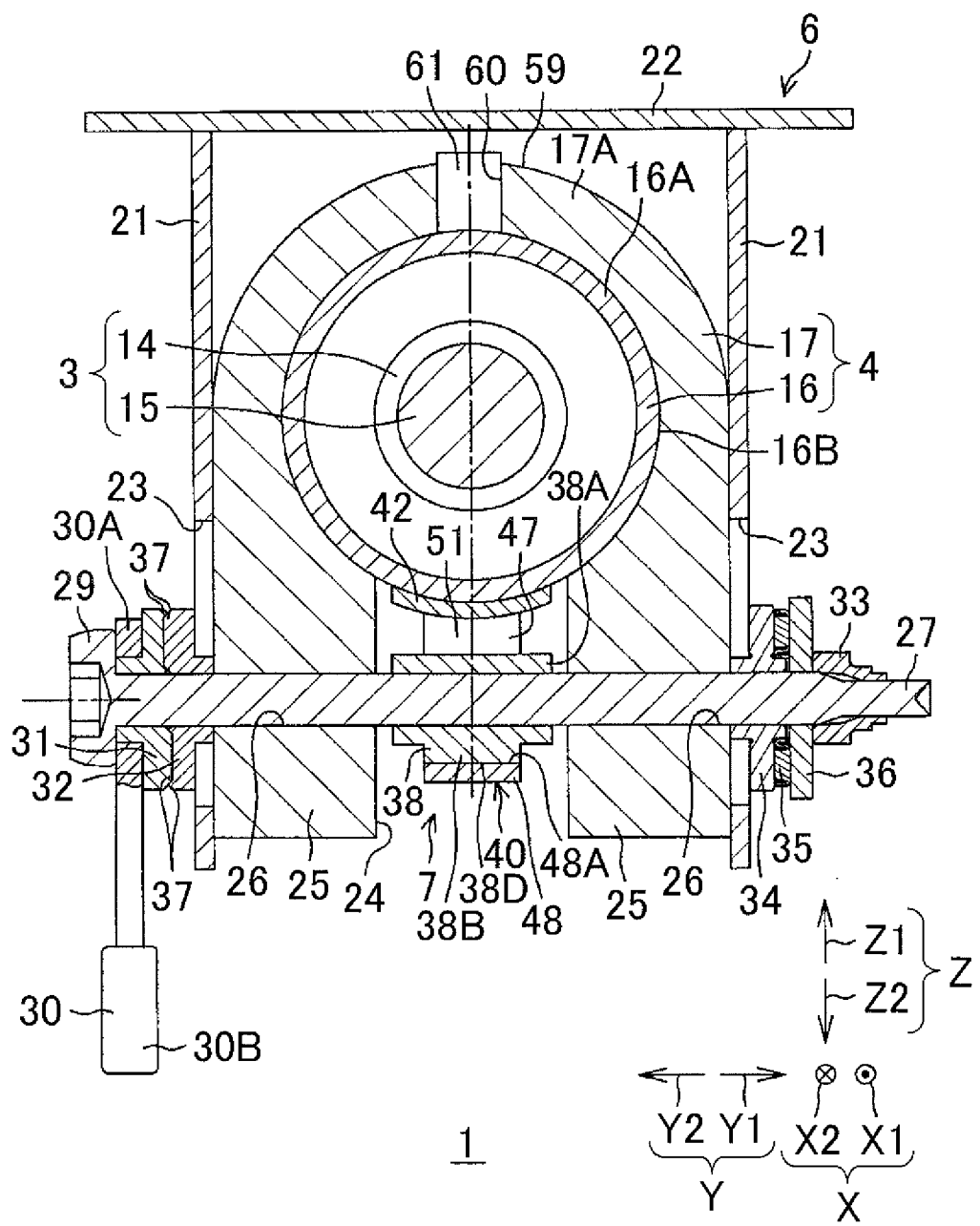
FIG. 3 is a schematic cross-sectional view of the steering device 1 taken along the line of FIG. 2.

FIG. 3 is a schematic cross-sectional view of the steering device 1 taken along the line III-III of FIG. 2.

With reference to FIG. 3, the upper bracket 6 has a groove shape that is opened downward, and is formed to be bilaterally symmetric with respect to the column jacket 4 so as to have a substantially U-shape that is vertically inverted when viewed from the axial direction X. Specifically, the upper bracket 6 integrally includes a pair of side plates 21 that oppose each other with the column jacket 4 interposed therebetween and a coupling plate 22 that is coupled to the upper end portions of the pair of the side plates 21. The side plate 21 is thin in the right-left direction Y, and the coupling plate 22 is thin in the up-down direction Z.

In the pair of the side plates 21, tilt elongated holes 23 are formed at the same positions when viewed from the right-left direction Y. The tilt elongated hole 23 extends in the up-down direction Z or, to be precise, in a tilt direction as a circumferential direction with the central shaft 20 (see FIG. 2) serving as the center. The coupling plate 22 has extending portions that extend outward in the right-left direction Y beyond the pair of the side plates 21, and the entire upper bracket 6 is fixed to the vehicle body 2 using bolts (not shown) or the like that are inserted into the extending portions.

Herein, in a portion on the lower side Z2 in the end portion 17A of the lower jacket 17 on the rear side X1, a slit 24 as a cut-out that extends in the axial direction X is formed (see also FIG. 1). The slit 24 is opened to both of the rear side X1 and the lower side Z2 from the end portion 17A toward the outside of the lower jacket 17 (see also FIG. 1). Accordingly, the end portion 17A of the lower jacket 17 has a vertically inverted substantially U-shaped cross section.

In addition, at the end portion 17A of the lower jacket 17, a pair of support portions 25 that extend to the lower side Z2 while defining the slit 24 in the right and left direction Y is integrally provided. Each support portion 25 has a substantially rectangular solid shape that spreads in the axial direction X and the up-down direction Z.

In the pair of the support portions 25, through holes 26 that pass through the support portions 25 in the right-left direction Y are formed at the same positions when viewed from the right-left direction Y.

The steering device 1 includes a clamping shaft 27 that is inserted into a portion where the through hole 26 and the tilt elongated hole 23 overlap each other when viewed from the right-left direction Y. The clamping shaft 27 has a substantially columnar shape that extends in the right-left direction Y. Both ends of the clamping shaft 27 in the right-left direction Y protrude outward in the right-left direction Y from the pair of the side plates 21 of the upper bracket 6. At the end portion of the clamping shaft 27 on the left side Y2, a head portion 29 having a diameter larger than that of the clamping shaft 27 is formed.

In the steering device 1, between the head portion 29 and the side plate 21 on the left side Y2, a grippable lever-type operation member 30 that is operated for the telescopic adjustment and the tilt adjustment, an annular cam 31, and a cam follower 32 are arranged in this order from the left side Y2.

The clamping shaft 27 is inserted into a base end portion 30A of the operation member 30 on one end side in a longitudinal direction, the cam 31, and the cam follower 32. Since the clamping shaft 27 is inserted into each tilt elongated hole 23 of the upper bracket 6, the operation member 30, the cam 31, and the cam follower 32 are supported by the upper bracket 6 via the clamping shaft 27.

The operation member 30 and the cam 31 can rotate integrally with each other relative to the clamping shaft 27, while the cam follower 32 can rotate relative to the clamping shaft 27 and can move in the right-left direction Y. However, a portion of the cam follower 32 that is inserted into the tilt elongated hole 23 of the side plate 21 on the left side Y2 is formed with two opposing surfaces, and hence the slipping of the cam follower 32 is prevented by the tilt elongated hole 23.

To the end portion of the clamping shaft 27 on the right side Y1, a nut 33 is attached. Between the nut 33 and the side plate 21 on the right side, an interposed member 34, a needle roller bearing 35, and a thrust washer 36 are arranged in this order from the left side Y2. The clamping shaft 27 is inserted into the interposed member 34, the needle roller bearing 35, and the thrust washer 36.

The clamping shaft 27 can move in the above-described tilt direction in each tilt elongated hole 23 of the upper bracket 6. When a use such as a driver moves the steering member 8 in the up-down direction Z for the tilt adjustment, the entire column jacket 4 tilts relative to the upper bracket 6 as described above. The tilt adjustment of the steering member 8 is performed within a range in which the clamping shaft 27 can move in the tilt elongated hole 23.

When a user grips a tip portion 30B of the operation member 30 on one end side in the longitudinal direction and rotates the operation member 30 about the clamping shaft 27 in a first direction after the user performs the telescopic adjustment or the tilt adjustment, the cam 31 rotates, and cam protrusions 37 formed on the cam 31 and the cam follower 32 get on each other. With this, the cam follower 32 moves to the right side Y1 along the axial direction of the clamping shaft 27, and is pushed against the side plate 21 on the left side Y2. By the pushing, the pair of the side plates 21 are clamped from both sides in the right-left direction Y between the cam follower 32 and the interposed member 34.

With this, the pair of the side plates 21 holds the support portions 25 of the lower jacket 17 between them from both sides in the right-left direction Y, and a frictional force is thereby generated between each side plate 21 and the support portion 25. With the frictional force, the position of the column jacket 4 is locked, and the steering member 8 is locked at the position after the tilt adjustment and is prevented from moving in the tilt direction.

In addition, the pair of the support portions 25 of the lower jacket 17 is held between the side plates 21, and the distance between the pair of the support portions 25 is reduced so that the inner portion of the lower jacket 17 is narrowed, and the lower jacket 17 comes in pressure contact with the upper jacket 16 in the lower jacket 17.

With this, the frictional force is generated between the upper jacket 16 and the lower jacket 17, and the position of the upper jacket 16 is thereby locked, and the steering member 8 is thereby locked at the position after the telescopic adjustment and prevented from moving in the axial direction X.

Thus, the state of the steering device 1 when the position of the steering member 8 is fixed in each of the tilt direction and the axial direction X is called a "locked state".

In the steering device 1 in the locked state, when the operation member 30 is rotated in a second direction opposite to the first direction, the cam 31 rotates relative to the cam follower 32, and the cam follower 32 moves to the left side Y2 along the axial direction of the clamping shaft 27. Then clamping to the pair of the side plates 21 between the cam follower 32 and the interposed member 34 is released. As a result, the frictional force between each side plate 21 and the support portion 25 and the frictional force between the lower jacket 17 and the upper jacket 16 disappear, and hence the steering member 8 becomes capable of moving in the axial direction X and the tilt direction. With this, it becomes possible to perform the telescopic adjustment and the tilt adjustment of the steering member 8 again.

Thus, the state of the steering device 1 when the fixing of the position of the steering member 8 in the tilt direction and the axial direction X is released is called a "lock-released state".

Next, the lock mechanism 7 will be described in detail. The lock mechanism 7 is a mechanism for firmly locking the upper jacket 16 such that the upper jacket 16 does not move in the axial direction X in the steering device 1 in the locked state, and is provided in the vicinity of the central portion of the clamping shaft 27 in the right-left direction Y.

Figure 4:
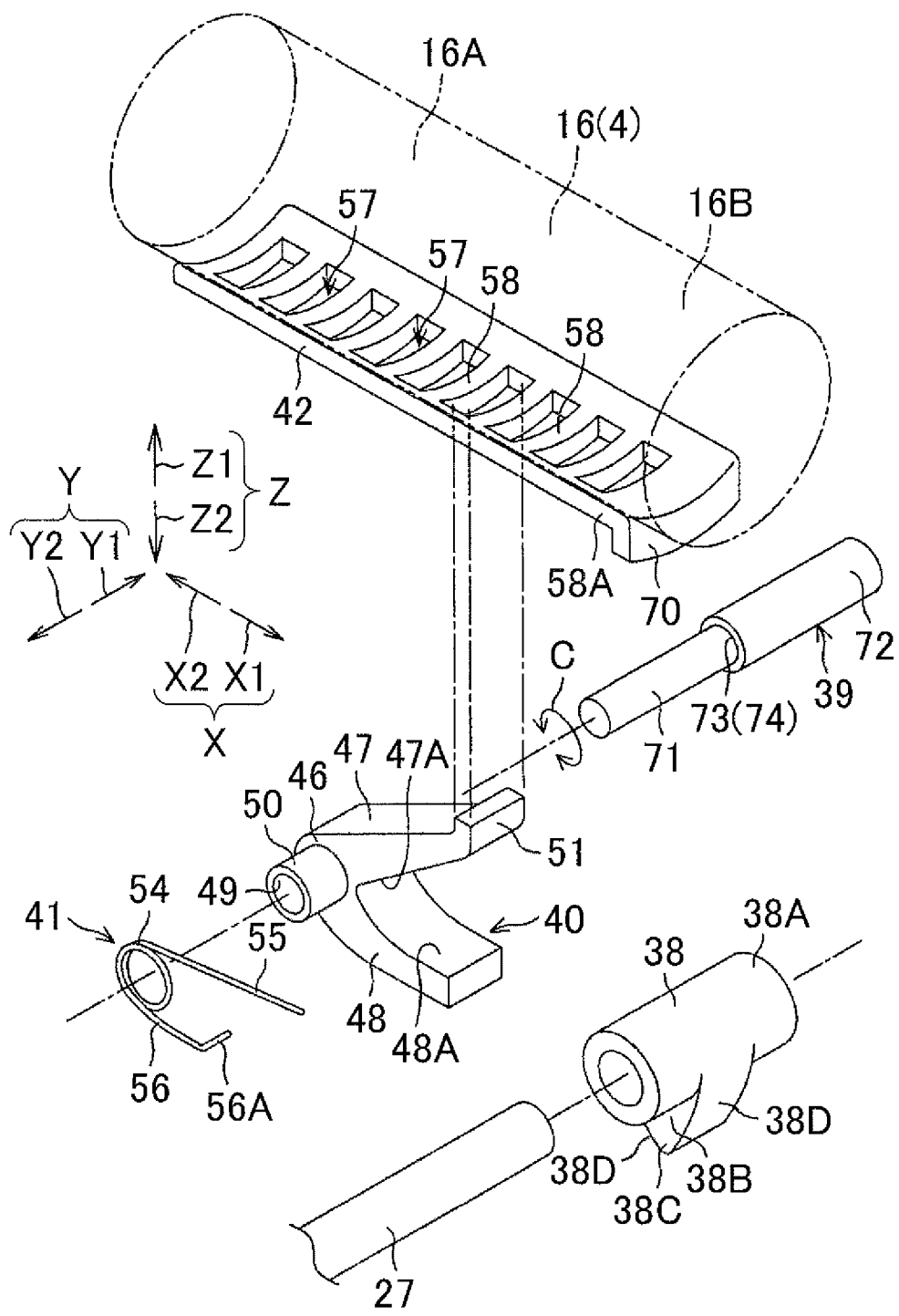
FIG. 4 is an exploded perspective view of the principal portion of the steering device 1.
Figure 5:
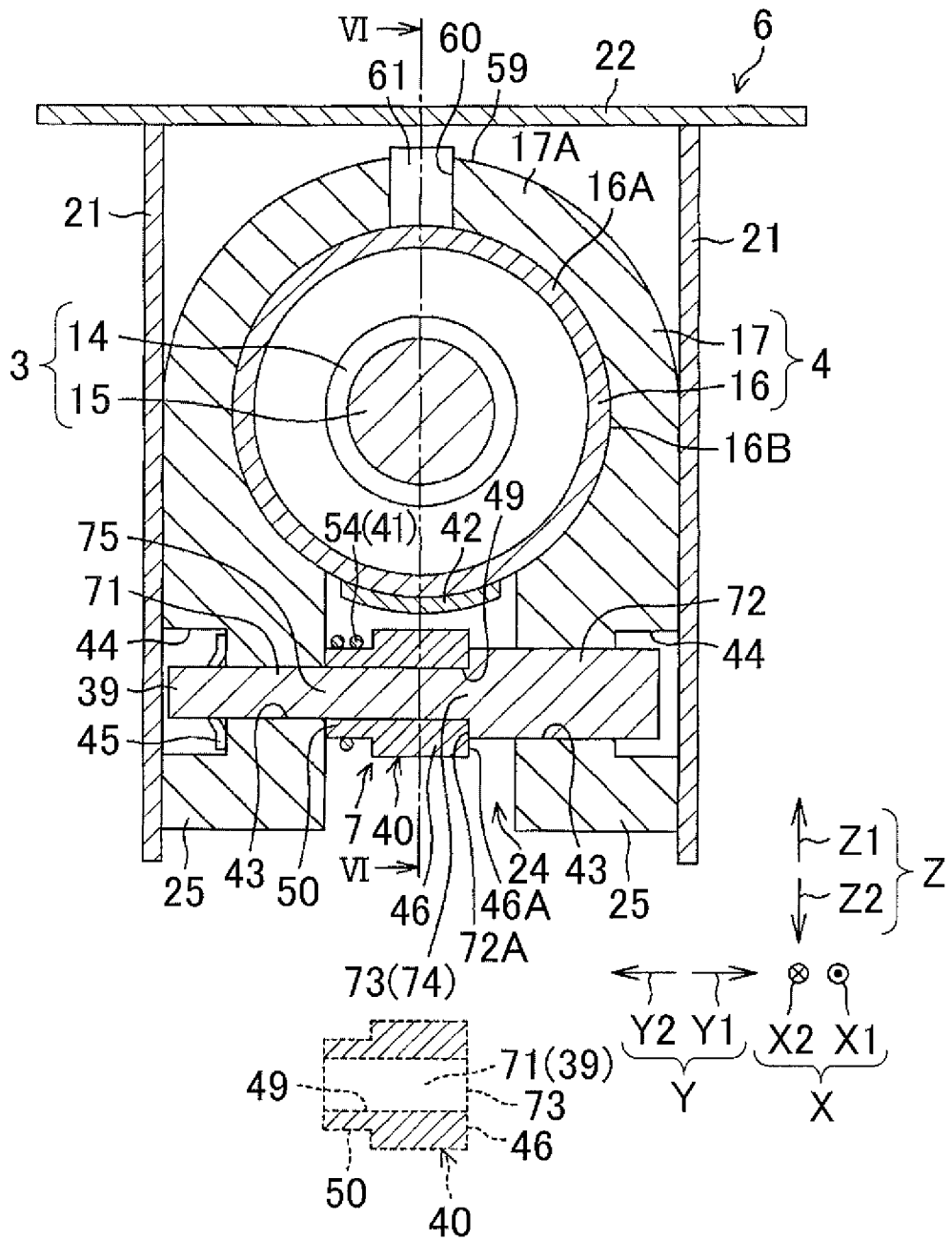
FIG. 5 is a schematic cross-sectional view of the steering device 1 taken along the line V-V of FIG. 2.

FIG. 4 is an exploded perspective view of the principal portion of the steering device 1. In FIG. 4, for the convenience of description, the upper jacket 16 is represented by using a two-dot chain line. FIG. 5 is a schematic cross-sectional view of the steering device 1 taken along the line V-V of FIG. 2. FIG. 6 is a schematic sectional view of the steering device 1 taken long the line VI-VI of FIG. 5. In FIG. 6, for the convenience of description, the depiction of the steering shaft 3 is omitted (the same applies to FIG. 7 described later).

With reference to FIG. 4, the lock mechanism 7 includes a cam 38, a support shaft 39, a lock member 40, a biasing member 41, and a lock plate 42.

The cam 38 integrally includes a cylindrical boss portion 38A that extends in the right-left direction Y, and a cam portion 38B that protrudes outward in the radial direction of the boss portion 38A from one position on the periphery of the boss portion 38A. The cam portion 38B has a substantially triangular shape that is tapered with approach to the outside in the radial direction of the boss portion 38A when viewed from the right-left direction Y.

The outer tip portion of the cam portion 38B in the radial direction is designated by a reference numeral "38C". The cam portion 38B has a pair of arc-shaped surfaces 38D that connect the tip portion 38C and the outer peripheral surface of the boss portion 38A and are smoothly coupled to each other on the outer peripheral surface of the boss portion 38A.

The cam 38 is disposed in the slit 24 of the lower jacket 17, and the portion of the clamping shaft 27 exposed in the slit 24 between the pair of the support portions 25 is inserted into the boss portion 38A (see also FIG. 3). The boss portion 38A and the clamping shaft 27 are fitted to each other by spline fitting or the like. Accordingly, the cam 38 can rotate integrally with the clamping shaft 27 in accordance with the operation of the operation member 30.

The support shaft 39 has a columnar shape that extends in the right-left direction Y as a cross direction to the axial direction X. The support shaft 39 is made of a resin. The support shaft 39 integrally includes a first shaft portion 71 that extends in the right-left direction Y, and a second shaft portion 72 that is thicker than the first shaft portion 71. Each of the first shaft portion 71 and the second shaft portion 72 has a columnar shape that extends in the right-left direction. The diameter of the second shaft portion 72 is larger than that of the first shaft portion 71. The second shaft portion 72 is coaxially coupled to the first shaft portion 71 from the right side Y1 In the support shaft 39, a boundary portion 73 between the first shaft portion 71 and the second shaft portion 72 serves as a low-strength portion 74 of which the strength is locally lowed.

With regard to the support shaft 39, with reference to FIG. 5, in the individual support portions 25 of the lower jacket 17, round through holes 43 that pass through the support portions 25 in the right-left direction Y are formed at positions on the front side X2 of the through holes 26. The inner diameter of the through hole 43 of the support portion 25 on the left side Y2 is substantially the same as the diameter of the first shaft portion 71, and the inner diameter of the through hole 43 of the support portion 25 on the right side Y1 is substantially the same as the diameter of the second shaft portion 72. In each support portion 25, the through hole 43 includes an increased diameter portion 44 of which the diameter is increased on the outside in the right-left direction Y. The support shaft 39 is inserted into the through holes 43 of the individual support portions 25. Specifically, in the support shaft 39, the first shaft portion 71 is inserted into the through hole 43 of the support portion 25 on the left side Y2, and the second shaft portion 72 is inserted into the through hole 43 of the support portion 25 on the right side Y1. The support shaft 39 is supported by the lower jacket 17 by being inserted into the through holes 43, and can rotate in a circumferential direction C of the support shaft 39 (see FIG. 4).

In the support shaft 39, the boundary portion 73 (the low-strength portion 74) between the first shaft portion 71 and the second shaft portion 72 is positioned in the slit 24 between the right and left support portions 25. Both end portions of the support shaft 39 in the right-left direction Y reach the increased diameter portions 44, and oppose the side plates 21 of the upper bracket 6 from the inside in the right-left direction Y with gaps interposed between the both end portions and the side plates 21. A push nut 45 as a biasing component included in the steering device 1 is attached to one of the end portions of the support shaft 39 in the right-left direction Y. In the present embodiment, the push nut 45 is fitted on the end portion of the support shaft 39 on the left side Y2 in the increased diameter portion 44 of the support portion 25 on the left side Y2. The support shaft 39 is biased to the left side Y2 by the push nut 45.

Returning to FIG. 4, the lock member 40 has a substantially V-shape that is inclined by 90° to the rear side X1 when viewed from the right-left direction Y. The lock member 40 is a sintered component that integrally includes a base end portion 46, and a lock portion 47 and a contact portion 48 that extend from the base end portion 46 to the rear side X1.

The base end portion 46 is a coupling portion of the lock portion 47 and the contact portion 48. The base end portion 46 is formed with an insertion hole 49 that passes through the base end portion 46 in the right-left direction Y. One cylindrical portion 50 that protrudes to the left side Y2 while surrounding the insertion hole 49 is formed on the side surface of the base end portion 46 on the left side Y2. The cylindrical portion 50 is considered to be a part of the base end portion 46.

The lock portion 47 has a shape that extends from the base end portion 46 to the rear side X1 and the upper side Z1. The end portion of the lock portion 47 on the rear side X1 serves as a tooth 51, and the tooth 51 is bent toward the upper side Z1.

The contact portion 48 has a shape that extends from the base end portion 46 to the rear side X1. The contact portion 48 is positioned on the lower side Z2 of the lock portion 47.

The above-described lock member 40 is disposed on the front side X2 of the cam 38 in the slit 24 of the lower jacket 17 (see also FIG. 6). The portion of the support shaft 39 described above positioned in the slit 24 is inserted into the insertion hole 49 of the base end portion 46 of the lock member 40.

Specifically, with reference to FIG. 5, the portion of the first shaft portion 71 of the support shaft 39 positioned in the slit 24 is inserted into the insertion hole 49 of the base end portion 46 of the lock member 40. In this state, the second shaft portion 72 of the support shaft 39 is positioned on the right side Y1 of the base end portion 46.

In addition, the push nut 45 biases the support shaft 39 to the left side Y2, whereby the boundary portion 73 between the first shaft portion 71 and the second shaft portion 72 of the support shaft 39, i.e., a side surface 72A of the second shaft portion 72 on the left side Y2 comes in surface contact with a side surface 46A of the base end portion 46 on the right side Y1 from the right side Y1, and biases the base end portion 46 to the left side Y2. That is, the push nut 45 biases the support shaft 39 such that a gap between the lock member 40 and the boundary portion 73 in the right-left direction Y is reduced or eliminated.

Further, the side surface 72A of the second shaft portion 72 biases the base end portion 46 to the left side Y2, and hence the cylindrical portion 50 positioned on the left side Y2 in the base end portion 46 comes in contact with the support portion 25 on the left side Y2 from the right side Y1.

Thus, with the biasing force of the push nut 45, the entire base end portion 46 including the cylindrical portion 50 is sandwiched between the support portion 25 on the left side Y2 and the boundary portion 73 of the support shaft 39 in the right-left direction Y without any gap.

The support shaft 39 and the base end portion 46 are fitted to each other so as to be integrally rotatable or rotatable relative to each other by lightly press-fitting or the like. Accordingly, the lock member 40 can rotate in the circumferential direction C about the center of the support shaft 39 (see FIG. 4) together with the support shaft 39.

In addition, the support shaft 39 is inserted into the through hole 43 of each support portion 25 of the lower jacket 17, whereby the lock member 40 is rotatably supported by the support shaft 39, and is also supported by the lower jacket 17 via the support shaft 39.

The above-described cam 38 is disposed between the lock portion 47 and the contact portion 48 of the lock member 40, and the cam portion 38B of the cam 38 comes in contact with an upper surface 48A of the contact portion 48 from the upper side Z1 (see FIG. 6).

In FIG. 4, the biasing member 41 is a spring formed by bending a wire or the like. The biasing member 41 integrally includes a coil-shaped portion 54 that is wound around the outer peripheral surface of the cylindrical portion 50 of the base end portion 46 on the left side Y2 from the outside, and a holding portion 55 and a deformed portion 56 that extend from the coil-shaped portion 54 to the rear side X1. The deformed portion 56 is disposed on the lower side Z2 of the holding portion 55. An end portion 56A of the deformed portion 56 on the rear side X1 is bent to the right side Y1.

In the biasing member 41, the holding portion 55 engages the outer peripheral surface of the portion of the boss portion 38A of the cam 38 on the left side Y2 of the cam portion 38B from the upper side Z1, and the end portion 56A of the deformed portion 56 engages the contact portion 48 of the lock member 40 from the lower side Z2 (see FIG. 6). In the biasing member 41, a force that moves the deformed portion 56 toward the holding portion 55 to the upper side Z1 is generated, and this force serves as a biasing force for biasing the entire lock member 40 to the upper side Z1 along the circumferential direction C.

The lock plate 42 has a plate shape that is long in the axial direction X and is thick in the up-down direction Z, and is curved along an outer peripheral surface 16B of the upper jacket 16.

The lock plate 42 is disposed at the portion of the underside of the outer peripheral surface 16B of the upper jacket 16 that is exposed to the slit 24 of the lower jacket 17 (see FIGS. 3 and 5). The lock plate 42 is fixed to the upper jacket 16 by welding or the like. Accordingly, the lock plate 42 can move relative to the lower jacket 17 in the axial direction X together with the upper jacket 16.

The lock plate 42 is positioned on the upper side Z1 of the lock member 40 or, to be precise, immediately above the lock member 40. Accordingly, the tooth 51 of the lock member 40 that is biased to the upper side Z1 by the biasing member 41 is biased toward the lock plate 42.

In the lock plate 42, a plurality of holes 57 that extend along the circumferential direction of the outer peripheral surface 16B of the upper jacket 16 are formed so as to be arranged in the axial direction X. The number of holes 57 is nine in the embodiment, but the number thereof is not limited thereto. Each hole 57 passes through the lock plate 42 in the up-down direction Z as the direction of thickness of the lock plate 42. Partition portions 58 are provided in the lock plate 42 so as to correspond to the plurality of the holes 57 on a one-to-one basis. The partition portion 58 is adjacent to the rear side X1 of the hole 57. Accordingly, the number of provided partition portions 58 is equal to the number of holes 57, and a plurality of the partition portions 58 are arranged in the axial direction X. The partition portion 58 other than the rearmost partition portion 58 closest to the steering member 8 forms a boundary portion between two holes 57 adjacent to each other in the axial direction X.

In the lock plate 42, the end portion of the rearmost partition portion 58A on the rear side X1 constitutes a stopper 70 that is bent to the lower side Z2.

In the above-described locked state shown in FIG. 6, the cam portion 38B of the cam 38 is directed to the front side X2, and the arc-shaped surface 38D of the cam portion 38B on the lower side Z2 comes in surface contact with the upper surface 48A of the contact portion 48 of the lock member 40 from the upper side Z1.

In the locked state, the tooth 51 in the lock member 40 is normally fitted in and engaged with any of the holes 57 in the lock plate 42 in a state in which the tooth 51 has entered the hole 57 of the lock plate 42 from the lower side Z2. The positions of the lock member 40 and the tooth 51 when the tooth 51 has entered the hole 57 of the lock plate 42 are called "advance positions".

The biasing member 41 biases the entire lock member 40 to the upper side Z1, as described above. With this, the tooth 51 is kept engaged with the hole 57 of the lock plate 42. That is, in the locked state, the tooth 51 is biased so as to be constantly positioned at the advance position.

In the state in which the tooth 51 of the lock member 40 is at the advance position and is engaged with any hole 57 in the lock plate 42 in the locked state, the tooth 51 engaged with the hole 57 is sandwiched between the partition portions 58 on both sides in the axial direction X. Accordingly, the movement of the lock plate 42 in the axial direction X is prevented by the lock member 40. In this connection, in the case where the tooth 51 is engaged with the frontmost hole 57, the tooth 51 is sandwiched between the frontmost partition portion 58 on the front side X2 of the other partition portions 58 and a front end portion 42A of the lock plate 42 that defines the hole 57 from the front side X2.

In addition, as described above, the lock plate 42 is fixed to the upper jacket 16, and the lock member 40 is fixed to the lower jacket 17 via the support shaft 39. Accordingly, when the tooth 51 is at the advance position in the locked state, the movement of the upper jacket 16 relative to the lower jacket 17 in the axial direction X is prevented.

With this, in addition to the frictional force between the lower jacket 17 and the upper jacket 16, the lock member 40 (the tooth 51) supported by the lower jacket 17 is engaged with the hole 57 of the lock plate 42 fixed to the upper jacket 16, and it is thereby possible to firmly lock the position of the upper jacket 16 in the axial direction X. Accordingly, the extension and contraction of the steering shaft 3 and the column jacket 4 are stopped and the position of the steering member 8 in the axial direction X is locked, and hence the telescopic adjustment is prevented from being performed.

As shown in FIG. 6, in the case where the steering device 1 is in the locked state and the tooth 51 is at the advance position, a vehicle having the steering device 1 and the vehicle body 2 can perform normal running.

At the time of a vehicle collision, a collision load from the rear side X1 caused by what is called a secondary collision acts on the steering shaft 3 and the column jacket 4. At this point, the upper jacket 16 and the upper shaft 14 starts to contract, whereby the load acts on the lock member 40 engaged with the hole 57 of the lock plate 42 from the rear side X1. With this, with reference to FIG. 5, the support shaft 39 that supports the tooth 51 (the lock member 40) is broken (sheared) at the boundary portion 73 as the low-strength portion 74. Herein, as described above, the push nut 45 biases the support shaft 39 to the left side Y2 such that the gap between the lock member 40 and the boundary portion 73 of the support shaft 39 in the right-left direction Y2 is reduced. Accordingly, at the time of the vehicle collision, it is possible to break the support shaft 39 at the boundary portion 73 with the lock member 40 in the boundary portion 73 (the side surface 46A of the base end portion 46 on the right side Y1).

In addition, at the same time, the first shaft portion 71 is thinner than the second shaft portion 72 and the first shaft portion 71 itself also serves as the low-strength portion 74. At the time of the vehicle collision, the support shaft 39 is broken not only at the boundary portion 73 between the first shaft portion 71 and the second shaft portion 72 but also at a boundary portion 75 between the support portion 25 on the left side Y2 and the lock member 40.

With the foregoing configuration, in accordance with breakage of the support shaft 39, the entire lock member 40 including the tooth 51 is disengaged from the hole 57 with which the lock member 40 has been engaged to be separated from the rest of the steering device 1 and then falls in the slit 24 as indicated by a broken line in FIG. 5. A part of the first shaft portion 71 of the support shaft 39 may remain in the insertion hole 49 of the falling lock member 40.

In accordance with the disengagement of the lock member 40 from the hole 57, the upper jacket 16 to which the lock plate 42 is fixed moves relative to the lower jacket 17 fixed to the lower bracket 5 so as to retract. With the breakage of the support shaft 39 and the movement of the upper jacket 16, it is possible to absorb energy at the time of the vehicle collision (at the time of the secondary collision).

Thus, only by providing the low-strength portion 74 in the support shaft 39 originally serving as a component for supporting the lock member 40, it is possible to absorb the energy at the time of the vehicle collision without adding a new component.

In addition, only by adjusting a breakage (shear) load of the support shaft 39 by changing the size of the low-strength portion 74, it is possible to arbitrarily adjust characteristics of energy absorption at the time of the vehicle collision. Herein, since the boundary portion 73 between the first shaft portion 71 and the second shaft portion 72 thicker than the first shaft portion 71 as well as the first shaft portion 71 in the support shaft 39 functions as the low-strength portion, only by adjusting a difference in thickness (diameter) between the first shaft portion 71 and the second shaft portion 72, it is possible to arbitrarily adjust characteristics of the energy absorption at the time of the vehicle collision.

As the result of the foregoing, it is possible to obtain desired characteristics of the energy absorption at the time of the vehicle collision while preventing an increase in the number of components.

In addition, with reference to FIG. 6, with the separation of the lock member 40 caused by the breakage of the support shaft 39, the lock member 40 no longer exists as an obstacle in the way of the stopper 70 that moves together with the upper jacket 16 for impact absorption. That is, with the separation of the entire lock member 40, it is possible to secure the movement space of the stopper 70. That is, with the simple structure obtained only by providing the low-strength portion 74 in the support shaft 39, it is possible to smoothly move the stopper 70 at the time of the breakage of the support shaft 39, and hence it is possible to achieve smooth impact absorption.

As described thus far, in the invention, the low-strength portion 74 as the shear portion is provided in the support shaft 39 as the hinge portion of the lock member 40.

For example, unlike the present embodiment, a configuration in which a groove is formed in the tooth 51, the portion of the tooth 51 in the vicinity of the groove is used as the low-strength portion 74, and, when the tooth 51 is broken in the vicinity of the groove at the time of the vehicle collision so that the energy at the time of the vehicle collision is absorbed with the movement of the upper jacket 16 can be conceived. However, in the configuration, it is difficult to perform adjustment for securing the strength of the entire lock member 40 including the tooth 51 and achieving the energy absorption function at the time of the vehicle collision at the same time. That is, in a normal state other than the state at the time of the vehicle collision, it is necessary to secure a certain level of the strength of the lock member 40 such that the state in which the tooth 51 at the advance position is fitted in the hole 57 is maintained, and adjust the timing of breakage of the tooth 51 such that the energy absorption amount at the time of the vehicle collision has a desired value. Correspondingly, the structure of the lock member 40 is complicated and fine adjustment is required, which may lead to an increase in cost.

On the other hand, in the present embodiment, since the low-strength portion 74 involved in the energy absorption at the time of the vehicle collision is provided in the support shaft 39 that is independent of the lock member 40, the strength of the lock member 40 is not reduced. In addition, since the low-strength portion 74 is provided in the boundary portion 73 between the first shaft portion 71 and the second shaft portion 72 where formation of the low-strength portion 71 is relatively easy, only by adjusting a difference in thickness between the first shaft portion 71 and the second shaft portion 72, it is possible to obtain a desired value of the energy absorption amount at the time of the vehicle collision at low cost with high accuracy.

FIG. 7 is a view showing a state in which the tooth 51 has retreated from the hole 57 in the steering device 1 shown in FIG. 6.

In the state in FIG. 6, the clamping shaft 27 is rotated by operating the operation member 30 such that the steering device 1 is switched from the locked state to the lock-released state. Then the cam 38 rotates integrally with the clamping shaft 27 counterclockwise when viewed from the left side Y2 such that the cam portion 38B that has been directed to the front side X2 is directed to the lower side Z2. With the rotation of the cam 38, the cam portion 38B pushes down the contact portion 48 of the lock member 40 to the lower side Z2.

With this, the entire lock member 40 rotates about the support shaft 39 to the lower side Z2 against the biasing force of the biasing member 41. With this, the tooth 51 of the lock member 40 starts to retreat from the lock plate 42 to the lower side Z2, and be disengaged from the hole 57 of the lock plate 42 with which the tooth 51 has been engaged.

As shown in FIG. 7, when the steering device 1 is brought into the lock-released state, the cam portion 38B is directed to the lower side Z2, and the lock member 40 is fully rotated to the lower side Z2. At this point, the tooth 51 of the lock member 40 completely retreats from the lock plate 42 to the lower side Z2, and is completely disengaged from the hole 57 of the lock plate 42 with which the tooth 51 has been engaged. The positions of the lock member 40 and the tooth 51 that have retreated from the lock plate 42 as thus explained are called "retreat positions".

Similarly to the locked state, in the lock-released state as well, the biasing member 41 biases the entire lock member 40 to the upper side Z1. In addition, the cam portion 38B of the cam 38 comes in contact with the contact portion 48 of the lock member 40 from the upper side Z1. Accordingly, the tooth 51 of the lock member 40 is biased toward the advance position (toward the side of the lock plate 42) by the biasing member 41, but the tooth 51 is positioned at the retreat position in the lock-released state.

In the state in which the tooth 51 is at the retreat position, the prevention of the movement of the lock plate 42 in the axial direction X by the lock member 40 is released. As a result, the upper jacket 16 can freely move relative to the lower jacket 17 in the axial direction X with the lock plate 42, and hence it becomes possible to cause the steering shaft 3 and the column jacket 4 to extend or contract to thereby perform the telescopic adjustment of the steering member 8. When the telescopic adjustment is performed, the individual holes 57 of the lock plate 42 sequentially pass on the upper side Z1 of the tooth 51 at the retreat position along the axial direction X. In addition, in this state, it is also possible to perform the tilt adjustment.

Herein, in the lower jacket 17, in an upper wall 59 positioned on the side opposite to the side of the support portion 25 with the upper jacket 16 interposed therebetween in the up-down direction Z, an elongated hole 60 extending in the axial direction X is formed.

The elongated hole 60 passes through the upper wall 59 of the lower jacket 17 in the up-down direction Z. Both end portions of the elongated hole 60 in the axial direction X are closed, and are not opened to the outside of the lower jacket 17.

Into the elongated hole 60, an engagement portion 61 is loosely inserted. The engagement portion 61 has a substantially rectangular solid shape. In the engagement portion 61, an engagement convex portion 62 provided on the surface on the lower side Z2 is fitted by, for example, press-fitting in an unremovable manner in an engagement concave portion 63 provided on the outer peripheral surface 16B of the upper jacket 16. With this, the engagement portion 61 is fixed to the upper jacket 16. The engagement portion 61 may also be fixed to the upper jacket 16 by welding or screw fastening.

The upper jacket 16 can move relative to the lower jacket 17 within a range in which the engagement portion 61 can move in the elongated hole 60. A length L (see FIG. 1) of the elongated hole 60 in the axial direction X corresponds to the sum of the maximum movement amount of the upper jacket 16 in the telescopic adjustment of the steering member 8 and the maximum movement amount of the upper jacket 16 for the energy absorption at the time of the vehicle collision.

In addition, when the stopper 70 positioned at the end portion of the lock plate 42 on the rear side X1 comes in contact with the tooth 51 at the retreat position from the rear side X1, the further movement of the upper jacket 16 to the front side X2 in the telescopic adjustment is prevented.

Subsequently, after the telescopic adjustment or the tilt adjustment of the steering member 8, as shown in FIG. 6, when the steering device 1 is brought into the locked state and the tooth 51 is moved to the locked position by operating the operation member 30 again, the position of the upper jacket 16 in each of the axial direction X and the tilt direction is locked. Thus, the lock member 40 can advance to or retreat from the lock plate 42 together with the tooth 51 in accordance with the operation of the operation member 30, and the tooth 51 of the lock member 40 is engaged with any of the holes 57 in the lock plate 42 in the state in which the lock member 40 has advanced to the lock plate 42 at the advance position.

Note that, during the locked state, even when the tooth 51 of the lock member 40 at the advance position cannot be engaged with the hole 57 of the lock plate 42 and gets on the partition portion 58, the upper jacket 16 moves in the axial direction X at the time of the secondary collision, and the tooth 51 is thereby engaged with the hole 57. Therefore, it is possible to apply the load to the above-described low-strength portion 74 and achieve target energy absorption at the time of the secondary collision.

The invention is not limited to the embodiment described above, and various changes can be made within the scope of the claims.

What is claimed is:

1. A steering device comprising:
   a steering shaft including a first end to which a steering member is mounted and a second end, wherein the steering shaft is telescopically adjustable in an axial direction of the steering shaft;
   a column jacket rotatably supporting the steering shaft and including an upper jacket positioned on a first end side and a lower jacket positioned on a second end side, wherein the column jacket is telescopically adjustable together with the steering shaft with movement of the upper jacket relative to the lower jacket in the axial direction;
   a lock plate fixed to the upper jacket and provided with a plurality of holes arranged in the axial direction;

a support bracket fixed to a vehicle body and supporting the column jacket;

an operation member supported by the support bracket, wherein the operation member is operated when the steering shaft and the column jacket are telescopically adjusted;

a support shaft that is supported by the lower jacket, extends in a cross direction crossing the axial direction, and includes a low-strength portion to be broken when a load acts on the steering shaft and the column jacket; and a lock member that is rotatably supported by the support shaft, advances to and retreats from the lock plate in accordance with operation of the operation member, and advances to the lock plate to be engaged with one of the holes, wherein the lock member is disengaged from the one of holes when the support shaft is broken in a state in which the lock member is engaged with the one of the holes.

2. The steering device according to claim 1, wherein:

the support shaft includes a first shaft portion that extends in the cross direction and a second shaft portion that is thicker than the first shaft portion; and the low-strength portion includes a boundary portion between the first shaft portion and the second shaft portion.

3. The steering device according to claim 2, further comprising a biasing component that biases the support shaft such that a gap between the lock member and the boundary portion in the cross direction is reduced.

* * * * *